US008591983B2

(12) United States Patent
Lebo, Jr. et al.

(10) Patent No.: US 8,591,983 B2
(45) Date of Patent: Nov. 26, 2013

(54) BYPASS PROTECTION FOR PROTEIN AND STARCH IN ANIMAL FEED

(75) Inventors: Stuart E. Lebo, Jr., Ringle, WI (US); Thomas S. Winowiski, Mosinee, WI (US)

(73) Assignee: Lignotech USA, Inc., Rothschild, WI (US)

( * ) Notice: Subject to any disclaimer, the term of this patent is extended or adjusted under 35 U.S.C. 154(b) by 1811 days.

(21) Appl. No.: 11/614,218

(22) Filed: Dec. 21, 2006

(65) Prior Publication Data

US 2008/0152755 A1 Jun. 26, 2008

(51) Int. Cl.
A23K 1/14 (2006.01)
A23K 1/18 (2006.01)
A23K 1/22 (2006.01)

(52) U.S. Cl.
USPC .............. 426/623; 426/69; 426/630; 426/647; 426/643; 426/644; 426/636; 426/656; 426/661; 426/807

(58) Field of Classification Search
USPC ......... 426/580, 623, 630, 643, 644, 647, 656, 426/661, 807, 69, 636
See application file for complete search history.

(56) References Cited

U.S. PATENT DOCUMENTS

| | | | | |
|---|---|---|---|---|
| 2,256,253 A | * | 9/1941 | Neuss | 525/54.1 |
| 2,332,519 A | * | 10/1943 | Leonardson et al. | 527/205 |
| 2,332,801 A | * | 10/1943 | Leonardson et al. | 527/100 |
| 2,332,802 A | * | 10/1943 | Leonardson et al. | 524/797 |
| 2,687,354 A | | 8/1954 | Gribbins | |
| 3,573,924 A | | 4/1971 | Zarow | |
| 3,619,200 A | | 11/1971 | Ferguson et al. | |
| 3,729,320 A | | 4/1973 | Kramer | |
| 3,873,733 A | | 3/1975 | Moore | |
| 3,934,041 A | | 1/1976 | Snyder | |
| 3,939,280 A | | 2/1976 | Karnemaat | |
| 3,989,846 A | | 11/1976 | Helgerson | |
| 4,186,213 A | | 1/1980 | Burroughs et al. | |
| 4,212,890 A | | 7/1980 | Tiefenbacher et al. | |
| 4,957,748 A | | 9/1990 | Winowiski | |
| 5,023,091 A | | 6/1991 | Winowiski | |
| 5,072,039 A | | 12/1991 | Worsley | |
| 5,075,402 A | | 12/1991 | Schmitt et al. | |
| 5,789,001 A | | 8/1998 | Klopfenstein et al. | |

FOREIGN PATENT DOCUMENTS

| | | |
|---|---|---|
| CA | 2041264 | 4/1991 |
| EP | 0 011 310 | 11/1979 |
| EP | 0086067 | 8/1983 |
| GB | 1 276 677 | 6/1969 |
| GB | 2013471 A * | 8/1979 |
| RU | 2169487 C1 * | 6/2001 |

OTHER PUBLICATIONS

Lorenz et al. Forest Products Journal, vol. 49, No. 3, pp. 73-78, 1999.*
"A Comparative Study of the Physical and Biological Properties of Commerc ially-Available Binders for Shrimp Feeds", Warren G. Dominy et al; Journal of Applied Aquaculture, Vo. 14 (3/4)2003; pp. 81-99.
"C Nuclear Magnetic Resonance of the Amorphous Polymer for Lysine-Formaldehyde-Urea"; Franklin E. Barton, II et al; J. Agric. Food Chem., vol. 26, No. 1,; Published, 1979.
"Effect of feeding slow-release urea-formaldehyde complexes (SRUFC) on the microbial protein synthesis and efficiency of N-utilization in crossbred cattle"; V.K. Sharma et al; Indian Journal of Animal Sciences 55 (11); Nov. 1985; pp. 958-963.
"The Effects of a Urea-Formaldehyde Resin Pellet Binder in Diets for laying Hens on Performance and Blood Parameters"; H.L. Stilborn et al; Nutrition Research, vol. 11, pp. 599-605; 1991.
"Evaluation of Slow Release Urea Formaldehyde Complexes (SRUFC'S) as Partial Substitutes of Protein in Crossbred Calves", V.K. Sharma et al; Asian J. Dairy Res., 4 (3); pp. 119-125. 1985.
"Conversion of Animal Wastes to Feed Supplements Via the Organiform Process", C.K. Davies et al; Managing Livestock Wastes; 3rd International Symposium on Livestock Wastes-1975; Apr. 21-24, 1975; University of Illinois, Urbana-Champaign, Illinois; American Society of Agricultural Engineers; pp. 227-229.
Effect of Polymethylolcarbamide (Urea Formaldehude Condensation Polymer) on Growth and Tissue Formaldehyde Residues in Shrimp:, F.L. Castille et al; Texas J. Agric. Nat. Resour., vol. 8, 1995; pp. 59-69.

* cited by examiner

*Primary Examiner* — Chhaya Sayala
(74) *Attorney, Agent, or Firm* — Andrus, Sceales, Starke & Sawall, LLP

(57) ABSTRACT

To increase the efficiency of utilizing protein, lipid and starch by ruminants, feed and urea-formaldehyde polymer are mixed in quantities suitable for a crosslinking reaction. The mixture is heated at a temperature, moisture content and time sufficient to covalently bond the urea-formaldehyde polymer with the proteins and starches to thereby protect the proteins, starches and contained lipids from degradation by rumen microbes.

29 Claims, 2 Drawing Sheets

BYPASS PROTECTION FOR PROTEIN AND STARCH IN ANIMAL FEED

BACKGROUND OF THE INVENTION

This invention relates to livestock, and more particularly to a livestock feed, the preparation of a livestock feed, and the feeding of livestock to increase utilization of protein, lipid and starch by ruminants.

It is known to treat feed for ruminants to reduce the microbial degradation of fed protein in the rumen. Various prior art methods of treating feed to reduce the microbial degradation of proteins have included (1) chemical treatment with tannin, (2) chemical treatment with formaldehyde, (3) heat treatment, (4) addition of spent sulfite liquor, (5) pelleting with calcium lignosulfonate, and (6) heat treatment combined with a reducing sugar.

Chemical treatment of feed with tannin is disclosed in U.S. Pat. No. 3,507,662. This patent discloses a process for protecting proteinaceous animal feed from rumen degradation by treatment of the feed with water and tanning agents, forming a paste, and drying at a temperature not to exceed 80 degrees centigrade. Subsequent work by Driedger (1972) J. Anim. Sci, 34:465 showed that tannin could be added to feed prior to pelleting, eliminating the paste forming step, and still effectively protect the protein from rumen degradation. Driedger used 20 percent tannin on soybean meal. Tannins, however, are subject to irreversible oxidative condensation which can render the protein unavailable in the abomassum (Fergusson, 1974, page 453 in Digestion and Metabolism in the Ruminant, Univ. New England Publ. Unit, Armidale, New South Wales, Aust.), and are not widely commercially accepted for use in feed treatment to protect protein.

Chemical treatment of feed with formaldehyde is described in U.S. Pat. No. 3,619,200. This patent discloses a feed for ruminants composed of proteinaceous material protected from rumen degradation by chemical modification of the protein through treatment with formaldehyde. Formaldehyde reacts with amino groups at neutral pH to form methylol groups which further condenses to form methylene bridges. In the acid pH of the abomassum, this reaction reverses, rendering the protein available and liberating formaldehyde (Fergusson, 1975). Hemsley, 1973, Australian J. Biol. Sci. 26:960 reported optimum treatment to be 0.8 to 1.2 percent formaldehyde. Higher levels would over-protect the protein and reduce nitrogen retention. Crawford, 1984, J. Dairy Sci. 67:1945 reported that the optimum treatment level will vary depending on the rate of passage of the feed through the rumen. Since this is highly variable, it may be difficult to use formaldehyde effectively. Although formaldehyde is approved for use as a biocide in feeds in the United States by the Food & Drug Administration, it is not approved to treat feed for ruminants to reduce microbial degradation of fed protein, lipid or starch in the rumen.

Heat treatment of feed is shown in U.S. Pat. No. 3,695,891. Heating proteinaceous feeds reduces degradability by reducing protein solubility and by blocking sites of enzyme attack through chemical modification. The reaction, however, is sensitive, and too little heat will not provide protection while too much heat will render the protein undigestible in the lower digestive tract (Sherrod, 1964, J. Anim. Sci. 23:510, and Plegge, 1982, J. Anim. Sci. 55:395).

Addition of spent sulfite liquor to feed is shown in Larsen, U.S. Pat. No. 4,377,596. Larsen discloses a method of feeding high producing dairy cows with a feed containing spent sulfite liquor in an amount of 0.25-3.0 percent by weight of the feed to increase milk production. The feed and spent sulfite liquor of Larsen is merely mixed together in a blender without any additional processing prior to feeding dairy cows. Larsen speculated that the lignin present in the spent sulfite liquor operated to protect the proteins in the feed from being destroyed by microorganisms present in the cow's first three stomachs. Additionally, Larsen speculated that the wood sugars in spent sulfite liquor may assist in better digestion of the materials present in the grains and roughage commonly found in feeds. However, it has now been shown that the lignin present in the spent sulfite liquor does not operate to protect proteins from degradation by microbes in the rumen, and the wood sugars in spent sulfite liquor do not necessarily provide better digestion of feed materials.

Pelleting feed with calcium lignosulfonate is shown in Stern, Can. J. Anim. Sci. 64 (Suppl.): 27-28 (September 1984). Based on continuous rumen culture in vitro studies Stern concluded that pelleting soybean meal with calcium lignosulfonate has potential for protecting protein from microbial degradation in the rumen. However, it has been discovered that calcium lignosulfonate is not the active component in spent sulfite liquor that protects the protein, and in fact pelleting with calcium lignosulfonate per se results in no protein protection.

Heat treatment combined with a reducing sugar is described in U.S. Pat. Nos. 4,957,748 and 5,023,091. To increase the efficiency of utilizing protein in feed by ruminants, feed containing a protein and a reducing sugar are mixed in quantities suitable for the Maillard reaction. The mixture is heated at a temperature, pH and time sufficient to cause early Maillard reactions, but not advanced Maillard reactions. Preferably, the sugar is xylose obtained by mixing sulfite liquor with the feed.

In U.S. Pat. No. 5,789,001, a ruminally inert fat for a ruminant feed is made by applying reducing sugars to oilseed meats and heating to induce non-enzymatic browning. The process is controlled to ensure penetration of the reducing sugars into the interior of cracked oilseed meat prior to browning. The browning reaction renders the protein which surrounds the oil resistant to rumen bacterial degradation to thereby encapsulate the oil in a protective matrix.

The prior art methods described above may be economical under some circumstances, but it is important to achieve the maximum cost saving and the best utilization of protein such as by increasing the efficiency with which fed protein is used by the animal. The prior art feeds and methods fall short of these goals by, in some cases, providing protein which has reduced nutritional value in an effort to increase the amount of protein actually transferred from the rumen to the small intestine of ruminants or have other disadvantages.

SUMMARY OF THE INVENTION

Accordingly, it is an object of the invention to provide a novel feed which increases the efficiency of utilization of protein, lipid and starch by animals.

It is a further object of the invention to provide a novel method for feeding livestock to increase the efficiency of utilizing protein, lipid and starch by the animals.

It is a still further object of the invention to provide a novel method for preparing a feed which reduces the microbial degradation of the fed protein, lipid and starch.

It is a still further object of the invention to provide a novel technique for utilizing urea-formaldehyde polymers (hereinafter referred to as "UF polymers") to increase the efficiency of utilization of fed protein, lipid and starch by animals.

It is a still further object of the invention to provide a novel feed which exhibits reduced degradation of protein, lipid and starch in the rumen so that these ingredients may be utilized in the lower digestive tract.

In accordance with the above objects, the invention is a novel process of utilizing UF polymers, water and heat to treat proteinaceous and starch feed ingredients in such a way that the protein, lipid and starch ingredients in the feed are more effectively utilized by ruminants. A novel animal feed and method of feeding animals is also provided. The combination of using a UF polymer with heat and time provides bypass protection for proteinaceous, lipid and starch materials far in excess to what can be achieved by simple heating during pelleting operations.

The animal feed made in accordance with the invention includes a substantial amount of reaction products of the proteinaceous material with UF polymers, and of the starch material with UF polymers. The ratio of UF polymers to protein and/or starch, temperature, time and percent moisture parameters are selected to achieve maximum protection of the protein, lipid and/or starch, for ruminants.

Generally, the proteins, lipids and starches are those found in high quality feed stuffs. Protein-containing feeds suitable for ruminants are well known and include soybean meal, other bean meal, cottonseed meal, feather meal, blood meal, silages, meat and bone meal, sunflower seed meal, canola meal, peanut meal, safflower meal, linseed meal, sesame meal, early bloom legumes, fish products, by-product protein feedstuffs like distillers and brewers grains, milk products, poultry products, hays, corn, wheat, alfalfa, barley, milo, sorghum, tapioca, and mixtures thereof as well as oilseeds, such as soybean, sunflower seed, canola seed, rape seed, cottonseed, corn, flaxseed, linseed, safflower seed, sesame seed, and mixtures thereof. Starch-containing feeds for ruminants are also well known and include corn, wheat, barley, milo, sorghum, tapioca and mixtures thereof. Lipid-containing feeds for ruminants are also well known and include oilseeds such as soybean, sunflower seed, canola seed, rape seed, cottonseed, corn, flaxseed, linseed, safflower seed, sesame seed, and mixtures thereof.

In one aspect of the invention, a feed for animals comprises a mixture of organic materials including at least one reaction product of a feed protein and/or a starch with UF polymers wherein the percentage of UF polymers on feed is about 0.1 percent to about 3 percent by weight such that degradability of the feed protein and/or starch by rumen microorganisms is reduced and there is no significant reduction of protein and/or starch digestibility in the post rumen tract.

In another aspect of the invention, a method of making a livestock feed comprises the steps of providing a mixture of a feed protein and/or starch with UF polymers such that the percentage of UF polymers on feed is about 0.1 percent to about 3 percent by weight, and heating the mixture at a temperature, pH and percent moisture for a time sufficient to reduce the degradability of the feed protein and/or starch by rumen microorganisms and provide no significant reduction in protein and/or starch digestibility in the post rumen tract. This method utilizes a pH of from about 4.0 to about 10.5, preferably about 6.0 to about 8.5, a percent moisture from about 6 percent to about 40 percent, preferably about 15 percent to about 25 percent, a temperature from about 20 degrees centigrade to about 150 degrees centigrade, preferably about 80 degrees centigrade to about 110 degrees centigrade, and a time from about 20 minutes to about 72 hours, preferably about 30 minutes to about 2 hours.

In still another aspect of the invention, there is provided a method of feeding animals comprising the steps of selecting a protein-containing and/or starch-containing feed suitable for a ruminant, and feeding to the ruminant a reaction product of the feed protein and/or starch with UF polymers wherein the percentage of UF polymers on feed is about 0.1 percent to about 3 percent by weight such that the degradability of the feed protein and/or starch by rumen microorganisms is reduced and there is no significant reduction of protein and/or starch digestibility in the post rumen tract. The mixture of protein and/or starch feed with UF polymers is heated at a temperature, pH and percent moisture and for a time sufficient to cause the reaction, but insufficient to significantly reduce the protein and starch digestibility in the post rumen tract.

The present invention further provides a feed for animals which includes ruminally inert lipid. Preferably the lipid is a vegetable oil. Thus, the vegetable oil is not hydrogenated by rumen bacteria nor does it inhibit fiber digestion yet the vegetable oil is digestible in the small intestine, and under some circumstances, some of it may be transferred into the animal's milk. If some or all of the lipids are vegetable oil, they may increase the proportion of lipids in that milk that are in monounsaturated or polyunsaturated form.

Protection is achieved by formation of covalent bonds between the UF polymer and the proteinaceous organic material which surrounds the oil in oilseed meats. The reaction product renders the proteinaceous material resistant to bacterial degradation and thereby encapsulated the oil in a protective matrix. The process comprises applying a UF polymer to oilseed meats and heating to induce bonding. The process is controlled to ensure penetration of the UF polymer into the interior of the oilseed meat before the reaction is initiated.

A feed for animals comprises a mixture of organic materials including at least one reaction product of an oilseed meat and a UF polymer. The percentage of UF polymer on oilseed meat may be in the range of about 0.1% to about 40% by weight depending upon the seed and UF polymer employed so that the overall percentage of UF polymer on total feed is about 0.1% to about 3.0% by weight. The actual percentage of UF polymer on oilseed meat depends on the UF polymer and on the protein. The oilseed meat is selected from soybeans, canola seed, cotton seed, sunflower seed, linseed, rape seed, corn, flaxseed, safflower seed and sesame seed, as well as mixtures thereof.

A method of making an animal feed comprises the steps of selecting a desired oilseed, cracking the seed, applying a UF polymer to the cracked seeds, allowing the UF polymer to penetrate into the interior of the seed, and thereafter heating the mixture at a temperature and percent moisture for a time sufficient to cause covalent bonding between the UF polymer and the proteinaceous organic material which surrounds the oil in the oilseed to thereby encapsulate the oil in a protective matrix. Cracking may be accomplished in any conventional manner, such as mechanically by a roller mill.

Application of the UF polymer is preferable as a solution and may also be done in any conventional manner such as spraying, dripping, mixing or the like. Advantageously, steam is employed to cause the UF polymer to penetrate the seed. However, other methods resulting in UF polymer penetration may also be employed such as allowing a mixture of the UF polymer and seed to steep, with or without heat, so that the UF polymer penetrates the interior of the seed and is positioned so that a sufficient amount of UF polymer surrounds a substantial portion of the oil bodies to cause bonding on more than one half of the oil bodies having a diameter of between 0.01 and 10 micrometers.

Finally, the mixture is heated, preferably by steam, to result in reaction at a percent moisture from about 6% to about 40% by weight, a temperature from about 20° C. to about 150° C., and for a time of from about 20 minutes to about 72 hours. Preferably, the steam not only causes UF polymers to penetrate the seed, but thereafter, the steam results in maintenance of an appropriate amount of heat to cause covalent bonding. It should also be understood that the seeds could be dried either before or after cracking in order to enhance the penetration of the UF polymer into the interior of the seed.

This improved by-pass protected feed may be substituted for a part or all of the usual protein-containing and/or starch-containing feed being supplied to the animal, resulting in improved efficiency of milk, meat and/or wool production. Specifically, increased production yields may be obtained with the same feed protein and starch levels, or the same production yields may be obtained at reduced feed protein and starch levels.

In particular, the ruminally inert vegetable oil is not hydrogenated by rumen bacteria so that the vegetable oil is digestible post ruminally and can be transferred into milk in monosaturated or in polyunsaturated form. In one embodiment, the seeds are selected, and under some circumstances, protein or fat added to provide the desired mixture of saturated and unsaturated lipids in the milk of an animal.

As can be understood from the above and following descriptions, the novel feed, method of making the feed and method of feeding animals has the advantage of providing a superior economical feed and method of feeding animals.

BRIEF DESCRIPTION OF THE DRAWINGS

The above noted and other features of the invention will be better understood from the following detailed description when considered with reference to the accompanying drawings in which.

DETAILED DESCRIPTION OF THE INVENTION

Figure 1:
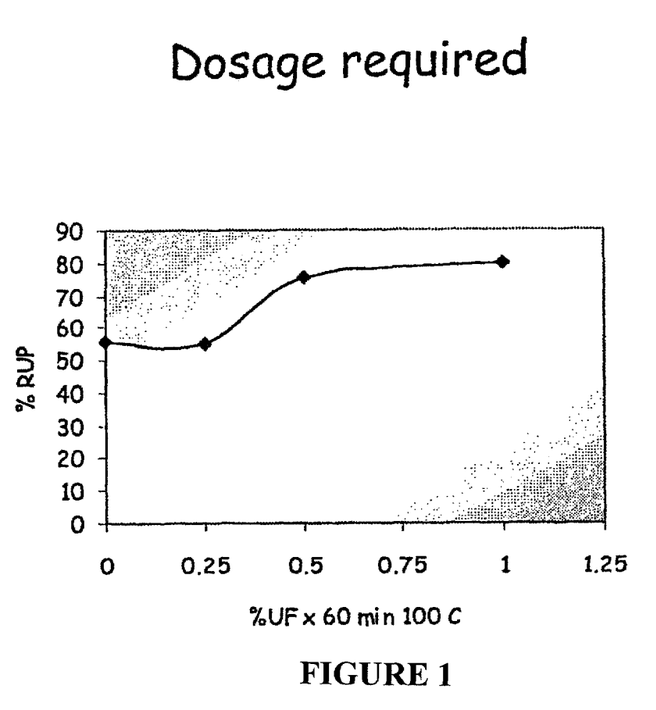
FIG. 1 is a graph illustrating the percent rumen undigested protein as a function of the dosage of UF polymer for a feedstuff heated at 100 degrees centigrade for 60 minutes.
Figure 2:
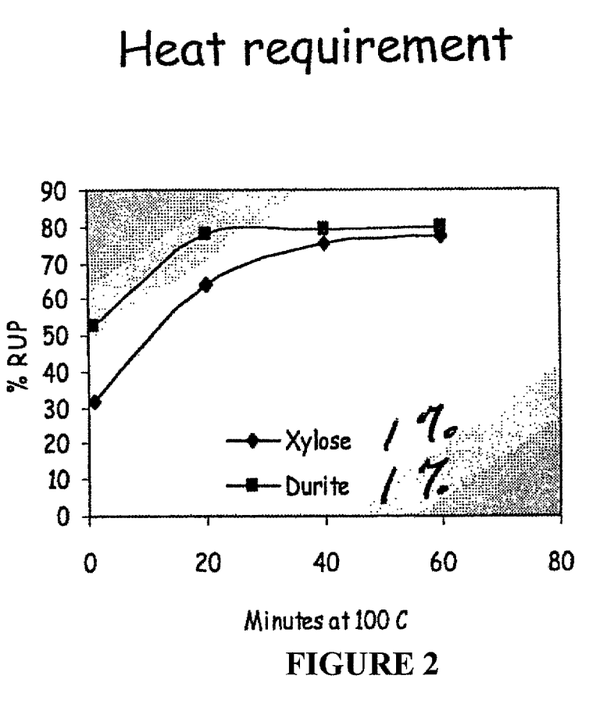
FIG. 2 is a graph illustrating the percent rumen undigested protein as a function of time for a feedstuff reacted with 1 percent by weight UF polymer at 100 degrees centigrade.

Broadly, the animal feed includes a substantial amount of reaction products of proteins with UF polymers and starches with UF polymers. UF polymers are well known as a condensation reaction product of urea and formaldehyde. The ratio of formaldehyde:urea (F:U) in the UF polymer is typically 2.0 to 0.8 by weight, with 1.8 to 1.0 being preferred, and about 1.6 being most preferred. The lower ratios of F:U have lower free formaldehyde, which is preferred. It should also be noted that the UF polymer utilized herein is sometimes referred to in the literature as a "polycarbimide". They are available commercially from numerous sources, such as from Borden Chemical, Inc. under the trade designation "Durite".

It should be clearly understood that the present invention does not utilize formaldehyde to provide the by-pass protection desired herein, but instead utilizes one or more UF polymers. Formaldehyde is a simple aldehyde with the following formula: $H_2C=O$. Urea has a similar structure, but the hydrogen groups have been replaced by amide groups: $(NH_2)_2 C=O$. Both of these have low molecular weights.

A urea-formaldehyde polymer, on the other hand, is a polymer made up of various mole ratios of these two monomers. The structure of the polymer will vary depending on the F/U ratio. While the exact structure of the various polymers is not completely known, UF polymers contain new carboxyl groups (i.e. $C=O$) with different reactivities than the carboxyl groups in either formaldehyde or urea, i.e. $H_2C=O + (NH_2)_2C=O \rightarrow H_2C(OH)-NH-C-NH_2$ dimer shown to emphasize $C=O$ group is different; the actual polymer gets quite complex depending on the F/U ratio.

Generally, the proteins, lipids and starches used are those found in high quality animal feedstuffs. Protein-containing feeds suitable for ruminants are well known and include soybean meal, other bean meal, cottonseed meal, feather meal, blood meal, silages, meat and bone meal, sunflower seed meal, canola meal, peanut meal, safflower meal, linseed meal, sesame meal, early bloom legumes, fish products, by-product protein feedstuffs like distillers and brewers grains, milk products, poultry products, hays, corn, wheat, alfalfa, barley, milo, sorghum, tapioca, and mixtures thereof as well as oilseeds, such as soybean, sunflower seed, canola seed, rape seed, cottonseed, corn, flaxseed, linseed, safflower seed, sesame seed, and mixtures thereof. Starch-containing feeds for ruminants are also well known and include corn, wheat, barley, milo, sorghum, tapioca and mixtures thereof. Lipid-containing feeds for ruminants are also well known and include oilseeds such as soybean, sunflower seed, canola seed, rape seed, cottonseed, corn, flaxseed, linseed, safflower seed, sesame seed, and mixtures thereof.

In this specification, the term "orthodox feed" means the feeds normally fed to ruminants. Such feeds are well-known in the art and include the high quality protein, lipid and starch feeds described above and other feeds, which because they are not considered a high quality protein feed, are less likely to be used in the treatment. Such orthodox feeds preferably include, the oilseeds and meals listed above, and most preferably are soybean meal, other bean meal, cottonseed meal, feather meal, blood meal, silages, meat and bone meal, sunflower seed meal, canola meal, peanut meal, safflower meal, linseed meal, sesame meal, early bloom legumes, fish products, by-product protein feedstuffs like distillers and brewers grains, milk products, poultry products, hays, corn, wheat, alfalfa, barley, milo, sorghum, tapioca, and mixtures thereof.

The particular feed may be selected for economic reasons or reasons of supply but, since the methods described herein are applicable to protein, lipid and starch in general regardless of the feed, the steps in performing the method are the same although the actual reaction products may differ.

For reasons of economy, this process is intended principally for protein supplements. In this specification, protein supplements are feedstuffs containing a minimum of 20 percent protein with at least 25 percent of that protein being microbially degradable protein. Microbially degradable protein in this specification is protein which is cleaved by microbial protease.

Similarly, by the term "reaction product of UF polymers and a protein" and the term "reaction product of UF polymers and a starch", when used in this specification, means a condensation product obtained by reacting: (1) any protein and/or starch useful in feeding livestocks and commonly found in orthodox livestock feeds; and (2) one or more UF polymer. Generally, it is believed that the reactions between amino groups in the proteins with carbonyl groups in the UF polymers.

This improved feed may be prepared in several different ways utilizing different ones of the suitable orthodox feeds and UF polymers as raw materials. In each case, a reaction takes place between the UF polymer and proteins and/or between the UF polymers and starches in the feed used as a raw material which reduces the degradation of the protein and starch in the rumen of an animal by microbes and thus increasing the protein and starch available for digestion in the small intestine of the animal.

With this product, there is less degradation of the protein and starch and less conversion to other nitrogen compounds, such as ammonia, by ruminal microbes. Most suitably, the feed material is mixed with the UF polymer to maximize the reaction. The temperature is selected along with percent moisture and time of treatment to maximize the production of compounds which resist degradation by ruminal microbes but nonetheless permit digestibility and use of the protein and starch in the post rumen tract.

It is believed the chemical reaction forming this feed comprises a condensation reaction between carbonyl groups in the UF polymers and amino groups of the protein and starch. The reactions readily occur and the temperature, moisture and time required to carry the reaction to the optimum extent can be determined with little experimentation.

It is believed that the reaction is generally a 1 mole to 1 mole reaction between free amino and carbonyl groups and the urea formaldehyde and with some consideration being given to other reactions in the feed, the quantities of UF polymer which are most economically utilized with the feed can be determined even though some suitable feed materials are not specifically described herein. The time and temperature and moisture offer leeway since a lower temperature for a longer time may be used in some circumstances or a higher temperature for a shorter time where economy dictates.

In general, the temperature of the reaction ranges from about 20 degrees centigrade to about 150 degrees centigrade with 80 degrees centigrade to 110 degrees centigrade preferred, and the time of the reaction ranges from about 20 minutes to about 72 hours with 30 minutes to 2 hours preferred. The amount of water affects the reaction, and the percent moisture ranges from about 6 percent to about 40 percent with 15 percent to 25 percent preferred.

Generally, the feed is prepared by mixing a UF polymer with a suitable protein and/or starch containing feed at a desired percent moisture in a controlled ratio and applying temperature for a time suitable to cause crosslinking reactions via covalent bonds. Thus, condensation products are formed between the UF polymer and a free amine group of an amino acid or protein in a 1:1 ratio.

In one aspect, the ruminant feed contains a mixture of organic materials including at least one reaction product of a feed protein and UF polymer wherein the percentage of UF polymer on feed is about 0.1 percent to about 3 percent by weight, preferably about 0.25 percent to about 2.5 percent by weight, and most preferably about 0.4 percent to about 1 percent by weight.

In another aspect, the ruminant feed contains a mixture of organic materials including at least one reaction product of a feed starch and UF polymer wherein the percentage of UF polymer on feed is about 0.1 percent to about 3 percent by weight, preferably about 0.25 percent to about 2.5 percent by weight, and most preferably, about 0.4 percent to about 1 percent by weight.

The source of the protein and starch is not significant as long as it is a protein and starch suitable for livestock and such proteins and starches are well-known. Generally, the pH is controlled to be above 4 and below 10.5 and preferably at 6 to 8.5. The pH is controlled by any suitable method including the addition of sodium hydroxide.

In feeding livestock, at least 50 percent and under some circumstances a 100 percent increase in the protein use efficiency may be taken into account and used either to increase the weight gain from protein limited diets or to reduce the cost of the feed. The treated feed material is intended primarily for ruminants and can be used accordingly as a substitute for untreated high-protein feed. In some cases, the corresponding untreated protein supplement that would otherwise be fed can be reduced and the amount of treated protein feed supplement is less than the untreated protein supplement because of the increased protein use efficiency of the treated protein supplement.

In another embodiment of the invention, an animal feed includes a substantial amount of small particles having a lipid interior and a coat formed of reaction products of proteinaceous membranes from oilseeds and a UF polymer. In the preferred embodiment, the oilseeds used to form this feed are those found in high quality feeds such as soybeans, canola seed, cotton seed, corn, flaxseed, sunflower seed, linseed, rape seed, safflower seed and sesame seed.

The improved feed described herein may be prepared in several different ways utilizing different ones of the suitable proteinaceous oilseeds and different ones of the UF polymers as raw materials. In each case, a reaction takes place between the UF polymers and proteins in the oilseeds, which encapsulate the oil in a protective matrix thereby forming a compartment of protected protein that contains lipid such that the entire compartment and its lipid content escape degradation by rumen bacteria yet are digestible in the small intestine or abomassum of the animal.

Since the rumen inert vegetable oil is digestible post-ruminally, some of it is transferred into the milk of the ruminant in polyunsaturated form. By rendering the vegetable oil "rumen inert", the energy density of the feed can be increased and the level of polyunsaturated fat in the milk increased while at the same time the formation of trans-fatty acids by bacterial hydrogenation in the rumen can be minimized. By "ruminally inert", it is meant the lipid is prevented from interaction with rumen bacteria yet is rendered available for digestion and absorption in the post-rumen gastrointestinal tract.

The percent of UF polymer on proteinaceous oilseeds ranges from about 0.1% to about 40% by weight depending upon the seed and UF polymer employed so that an amount of about 1% to about 3% on total feed is appropriate.

Generally, the feed is prepared by first selecting the desired oilseed or mixture of seeds, and then breaking the seed cuticle by mechanical cracking, e.g. a roller mill operation. Any method of breaking or cracking the seed cuticle may be employed as long as the seed is not crushed to release its oil during the process.

After cracking, the seed is treated with UF polymer by applying the UF polymer, preferably in solution, in any conventional manner to the exterior of the seed. For example, the UF polymer may be applied by spraying the solution thereon, dripping the solution thereon, mixing or other means.

Thereafter, the UF polymers in the mixture are caused to penetrate the interior of the seed. This can be accomplished with or without heat. If no heat is utilized, the mixture is typically allowed to steep anywhere from about one minute to one hour to ensure penetration of the UF polymers into the interior of the seed. Heat may also be utilized to cause the UF polymers to penetrate the seed.

If heat is employed, steam is preferred. Heating with steam causes a net migration of moisture to be from the surface of the seed to its center, which thus carries the UF polymer along with it into the interior of the seed. This penetration of heat and UF polymer at the same time contributes to a more uniform protection throughout the seed particle. Thus, when the seed particle is thereafter ground, there is no loss in protein protection and the vegetable oil contained therein remains ruminally inert. In this manner, mastication by the animal cannot destroy the protection.

After sufficient penetration by the UF polymers, the seed and UF polymers are heated at a temperature, moisture level and time sufficient to cause formation of covalent bonds. If steeping was employed, the mixture can be roasted with hot air or heated with steam. Likewise, if steam was employed to cause penetration of the UF polymers, heating is thereafter maintained to produce the desired covalent bonding. Again, either roasting with hot air or heating with steam may be employed to cause bonding, but if steam was employed to cause penetration of the UF polymers, it is desirable to continue to use steam to result in bonding. Thus, the term "sufficient penetration" means, in this specification, that enough of the UF polymer is distributed within the oilseed so that at least thirty percent of the lipids are sufficiently encased after appropriate heating and time for the covalent bonding reaction to take place and for the lipid bodies within the oil seed to be rumen inert.

As an optional step, the seeds may be dried before or after cracking. Typically, this is accomplished by heating with hot air. The advantage to drying the seeds prior to application of the UF polymer solution is that dry seeds more readily absorb the UF polymer into the interior of the seed since the low moisture content of the seed tends to draw the UF polymer solution into its interior. However, drying increases production costs and thus is not essential to protecting the lipid in accordance with the present invention.

The resulting product includes bodies of lipids ranging in size from one half micrometer to 10 micrometers, but being concentrated in a size range depending on the type of oilseed. In the case of soybeans, the size range is between 0.5 and 2 micrometers. These bodies include lipid in its in situ natural form surrounded by a reaction product of a protein and a UF polymer, with the ratio of reaction product to lipid being between 1% to 35%. The protein layer is more dense than the lipid layer and relatively thin being less than 10% of the diameter of the oil body in thickness. These bodies which protect the oil within a reaction product of a protein and a UF polymer are referred to herein as by-pass protected oil particles.

Once the by-pass protected oil particles have been formed in the processed oilseed, the oilseed may be ground because the protected particles are so small many remain intact and provide a ground meal with substantial rumen inert oil. The type of proteins forming the shell around the lipid is oleosin and the reaction product of the protein and UF polymer has a ratio of UF polymer on the oleosins of about 0.5% to about 40% by weight such that the degradability of the feed protein by rumen microorganisms is reduced and there is significant protein and lipid digestibility in the post rumen tract.

The amount of by-pass protected lipid in a feed can be tailored to the situation. Thus, the amount of protein and the amount of protected lipid can be determined in a given feed. Moreover, with some experimentation, the amount of protected lipid that is carried over into the milk of milk producing ruminants without alteration may be determined and a final composition of feed including at least some by-pass protected lipids may be selected to alter the characteristics of the milk into a desired form.

An example of a complete ration that would include rumen undigested protein (RUP) and rumen undigested fat (RUF) from soybeans would be:

| Ingredient | % |
|---|---|
| alfalfa silage | 12.5 |
| corn silage | 37.5 |
| ground corn | 24.5 |

-continued

| Ingredient | % |
|---|---|
| UF polymer treated soybeans | 22.5 |
| SoyPass protein bypass supplement | 0.8 |
| mineral/vitamin mix | 1.4 |

The amounts are expressed as a percentage of dry matter. This formulation provides 18.9% crude protein and 4.5% added lipid.

An example of a complete ration that would include RUP from soybean meal would be:

| Ingredient | % |
|---|---|
| corn silage | 33.4 |
| alfalfa haylage | 15.0 |
| bromegrass hay | 5.0 |
| ground corn | 25.7 |
| soyhulls | 10.3 |
| UF polymer treated soybean meal | 6.8 |
| urea | 1.0 |
| dicalcium phosphate | 0.94 |
| mineral/vitamin mix | 1.86 |

The amounts are expressed as a percentage of dry matter. This formulation provides 16.3% crude protein.

Examples of commercial feeds that might utilize this technology include Rally and MetaPro from Lake O'Lakes Purina Feeds LLC. Rally is a high energy (lipid) ration and MetaPro is formulated to maximize protein efficiency (RUP).

Example 1

Solvent extracted soybean meal was sieved to a particle range for testing with diameters between 0.8 and 1.7 millimeters. A portion was set aside without any treatment to act as a negative control (Control). A second portion was combined with a xylose rich lignosulfonate (Xylig™) such that the Xylig™ comprised 5% of the dry matter of the mixture and provided approximately 1% xylose. Prior to mixing, sufficient water was added to the Xylig™ to take the total moisture content of the final mixture to 20%. The mixture was placed in a covered beaker, heated rapidly in a microwave oven to approximately 95° C., and then transferred to a 105° C. convection oven for 60 minutes. The resulting dark brown (Maillard reaction) material was spread on paper to cool and dry. This non-enzymatically browned soybean meal (NEBSBM) was the positive control. A third portion was treated in a similar manner except Xylig™ was replaced by Durite AL3029R™, a liquid polycarbimide produced by Borden Chemical.

Samples were tested for crude protein (CP) which was reported as a percentage of dry matter (DM). Samples were tested for rumen undegradable protein (RUP) by incubation in a porous dacron bag suspended in the rumen of a dairy cow for 16 hours, after which the residual crude protein was measured and reported as a percentage of the original protein placed in the bags.

TABLE A

Effect of 5% Durite ™

| Treatment | CP, % of DM | RUP, % of CP |
|---|---|---|
| Control | 51.2 | 21.1 |
| NEBSBM | 51.2 | 83.5 |
| 5% Durite | 60.7 | 80.8 |

Treatment with 5% Durite™ resulted in an RUP level that was similar to the positive control. In addition, treatment with Durite™, a nitrogenous polymer, increased the level of crude protein in the sample. This is an important advantage because the end use of the product is as a protein source for ruminants.

Example 2

Samples were prepared as in Example 1 with the exception of the treatment agents used. Group 1 was a positive control consisting of three different lots of SoyPass™, a non-enzymatically browned commercially produced bypass soybean meal. Group 3 was a second positive control consisting of laboratory samples treated with 5% Xylig™. Xylig™ is a xylose-rich lignosulfonate that contributes approximately 1% xylose and contains no nitrogen. Treatment method was as in Example 1 except that pH of the Group 3 mixture was raised above by addition of caustic. Group 2 was treated with 1% and 2% Durite™ in place of 5% Xylig™. This example shows that use of Durite™ in place of Xylig™ once again gave similar RUP levels with increased crude protein.

TABLE B

Effectiveness of 1 and 2% Durite ™

| Group | Sample I.D. | Comment | CP, % of DM | RUP, % of CP |
|---|---|---|---|---|
| 1 | NOPA 99284 | SoyPass ™ | 51.4 | 78.9 |
|  | NOPA 99609 | SoyPass ™ | 52.3 | 79.9 |
|  | NOPA 100272 | SoyPass ™ | 51.5 | 75.1 |
| 2 | 399-94-E | 1% Durite ™ | 55.0 | 81.5 |
|  | 399-94-F | 2% Durite ™ | 56.2 | 85.3 |
| 3 | 399-94-B2R | Xylig ™, pH 6.2 | 51.9 | 80.4 |
|  | 399-94-C2R | Xylig ™, pH 6.5 | 52.0 | 83.0 |
|  | 399-94-G | Xylig ™, pH 7.7 | 51.6 | 82.2 |

Example 3

Samples were prepared as in Example 1. Durite™, applied at 0.25, 0.5, and 1.0 percent, was the sole treatment agent. Results indicate that 0.5% Durite™ is nearly as effective as 1.0 percent.

TABLE C

Effectiveness of low levels of Durite ™

| I.D. | Description | CP, % of DM | RUP, % of CP |
|---|---|---|---|
| 399-100-13 | 0.25% Durite ™ | 52.4 | 52.1 |
| 399-100-14 | 0.5% Durite ™ | 52.9 | 75.7 |
| 399-100-12 | 1.0% Durite ™ | 53.6 | 79.6 |

Example 4

Samples were prepared as in Example 1 except heating time was varied between one and 40 minutes instead of the standard 60 minute heating. Treatment agents were 1% Durite™ or 1% xylose sugar from Aldrich Chemical. With only one minute of heating Durite™ produced a substantial increase in RUP versus xylose which had no effect. After 20 minutes of heating with Durite™ the product had achieved the desired RUP level of greater than 70%. Forty minutes were required to achieve a similar level with xylose.

TABLE D

Heating requirement with Durite ™ versus xylose

| I.D. | Description | Oven time, min. | CP, % of DM | RUP, % of CP |
|---|---|---|---|---|
| 399-100-1 | Untreated | 0 | 53.1 | 31.8 |
| 399-100-5 | 1% xylose | 1 | 51.9 | 31.7 |
| 399-100-7 | 1% xylose | 20 | 51.6 | 64.3 |
| 399-100-9 | 1% xylose | 40 | 51.7 | 75.6 |
| 399-100- | 1% xylose | 60 | 51.9 | 77.1 |
| 399-100-6 | 1% Durite ™ | 1 | 53.2 | 52.5 |
| 399-100-8 | 1% Durite ™ | 20 | 54.2 | 77.9 |
| 399-100-10 | 1% Durite ™ | 40 | 52.7 | 79.5 |
| 399-100-12 | 1% Durite ™ | 60 | 53.6 | 79.6 |

Example 5

Samples were prepared as in Example 1 except the soybean meal was used as received from the commercial supplier without any sieving. In addition, heating times were varied from 1 to 20 minutes. Treatment agents were 0.5 or 1.0% Durite™ and 5% Xylig™. Results show that treatment with 5% Xylig™ reduced crude protein content versus treatment with Durite™ which contributes to crude protein. The desired RUP level (greater than 70%) was achieved with only 10 minutes of oven time for Durite™ versus 20 minutes required for Xylig™. Durite™ at 0.5% was as effective as Xylig™ at 5%.

TABLE E

Heating requirement for Durite ™ versus Xylig ™

| I.D.: 423-1- | Description | Oven time, min. | CP, % of DM | RUP, % of CP |
|---|---|---|---|---|
| 1A, 1B, 4A, 4B | 5% Xylig ™ | 1 | 50.4 | 46.8 |
| 2A, 2B, 5A, 5B | 5% Xylig ™ | 10 | 50.2 | 67.6 |
| 3A, 3B, 6A, 6B | 5% Xylig ™ | 20 | 50.4 | 73.5 |

TABLE E-continued

Heating requirement for Durite ™ versus Xylig ™

| I.D.: 423-1- | Description | Oven time, min. | CP, % of DM | RUP, % of CP |
|---|---|---|---|---|
| 10A, 10B | 0.5% Durite ™ | 20 | 53.6 | 75.6 |
| 7A, 7B | 1% Durite ™ | 1 | 53.5 | 55.9 |
| 8A, 8B | 1% Durite ™ | 10 | 54.5 | 71.5 |
| 9A, 9B | 1% Durite ™ | 20 | 54.6 | 80.8 |

Example 6

Samples were prepared as in Example 1 except the soybean meal was used as received from the commercial supplier without any sieving. Durite™ was applied at the 1% level and heating time was 30 minutes for all samples. Total moisture of the treated mixture was varied between 10 and 30%. Samples containing 10% and 30% were prepared and tested in duplicate. Results indicate that performance remains satisfactory at 30% moisture although there is a tendency to decline at that level. Sample 421-25-3 was further incubated in the rumen for 72 hours after which only 10.7% of the original dry matter remained. This indicates the Durite™ treated samples are digestible.

TABLE F

Effect of process moisture on RUP with 1% Durite ™

| I.D. | Moisture | Cook time, min. | CP, % of DM | RUP, % of CP |
|---|---|---|---|---|
| 421-25-1 | 10% | 30 | 53.4 | 85.2 |
| 421-25-2 | 10% | 30 | 53.0 | 85.8 |
| 421-25-3 | 20% | 30 | 52.8 | 85.0 |
| 421-25-4 | 30% | 30 | 53.3 | 79.6 |
| 421-25-5 | 30% | 30 | 54.5 | 79.2 |

Example 7

Various proteinaceous feed ingredients were treated with 1% Durite™ and sufficient water to raise total moisture of the mixture to 20%. Soybeans, canola seeds, and linseeds were coarsely ground prior to treatment. Canola meal was used as received from the commercial supplier. Samples were treated with water only or with water plus 1% Durite™. These samples were placed in covered beakers, heated to approximately 95° C. in a microwave oven and held for one hour in a 105° C. convection oven. Samples were then spread on paper to cool and dry at ambient temperature.

These samples were tested for crude protein (CP) and crude fat (CF), both reported as a percentage of dry matter (DM). Samples were also tested for rumen undegradable protein (RUP) and rumen undigested fat (RUF) by incubation in porous dacron bags suspended in the rumen of a dairy cow for 16 hours. Following incubation the residual dry matter was tested for crude protein and crude fat. RUP and RUF values are calculated as the percentage of residual protein and fat remaining in the bag versus the original amount added.

Treatment with 1% Durite™ substantially increased RUP in each of the four feed ingredients tested. In addition, RUF of cracked soybeans and canola seeds was increased by treatment with Durite™.

TABLE G

Protection of various feed ingredients with 1% Durite ™

| Feed Ingredient | I.D.: 423-4- | Treatment | CP, % of DM | Fat, % of DM | RUP, % of CP | RUF, % of Fat |
|---|---|---|---|---|---|---|
| Cracked soybeans | 1A | Untreated | 40.8 | 20.9 | 20.7 | 10.7 |
| | 1B | 0% Durite ™ | 42.3 | 21.7 | 55.7 | 44.3 |
| | 1C | 1% Durite ™ | 43.9 | 21.5 | 76.2 | 52.0 |
| Cracked canola seed | 2A | Untreated | 21.6 | 40.6 | 19.3 | 22.2 |
| | 2B | 0% Durite ™ | 21.2 | 42.8 | 39.1 | 35.3 |
| | 2C | 1% Durite ™ | 23.1 | 43.8 | 55.2 | 44.2 |
| Cracked linseed | 3A | Untreated | 23.3 | 17.0 | NA | NA |
| | 3B | 0% Durite ™ | 22.8 | NA | 26.5 | NA |
| | 3C | 1% Durite ™ | 24.9 | NA | 33.2 | NA |
| Canola meal | 4A | Untreated | 43.7 | NA | 16.7 | NA |
| | 4B | 0% Durite ™ | 40.8 | NA | 25.5 | NA |
| | 4C | 1% Durite ™ | 44.0 | NA | 47.3 | NA |

CP = crude protein,
DMD = dry matter disappearence,
RUP = rumen undegraded protein,
RUF = rumen undigested fat,
NA = not analysed Example 8

A commercial grain concentrate for dairy cattle was treated with 1% Durite™ and sufficient water to take total moisture of the mixture to 20%. Composition of this dairy feed was: barley, 45%; oat meal, 25%; soybean meal, 10%; wheat, 7%; rape, 5%; molasses, 5%; and vitamin 3%. The mixture was placed in a covered beaker, heated to approximately 95° C. in a microwave oven and held for 30 minutes in a 105° C. convection oven. The sample was then spread on paper to cool and dry at ambient temperature.

Samples of both treated and untreated dairy concentrate were tested for crude protein (CP) as a percentage of dry matter (DM). Samples were also tested for rumen undegradable protein (RUP) by incubation in porous dacron bags suspended in the rumen of a dairy cow for 16 hours. Following incubation the residual undigested dry matter (RUDM) was weighed and tested for crude protein. RUP and RUDM values were calculated as the percentage of residual protein and residual dry matter in the bag versus the original amount added.

Only 21.9% of the original dry matter remained undigested after 16 hours of incubation in the rumen. This contained 1.8 units of protein and 20.1 units of other feed components. It is likely that this 'other' material is largely composed of undigestible cereal hulls. Treatment with 1% Durite™ increased the RUDM to 40.5% which included 10.5 units of RUP and 30 units of non-protein material. This net increase of 9.9 units of non-protein material is primarily composed of starch, the major component of cereal grains. Thus, treatment of cereal grain concentrates with Durite™ has the added benefit of protecting starch from digestion in the rumen.

TABLE H

Effect of 1% Durite ™ treatment on a mixed dairy feed

| I.D. | Description | CP, % of DM | RUP, % of CP | RUDM, % of DM |
|---|---|---|---|---|
| 423-5-A | Untreated | 16.8 | 11.0 | 21.9 |
| 423-5-L | 1% Durite ™ | 19.8 | 53.3 | 40.5 |

Example 9

Soybean meal was pelleted using various commercial polycarbimide based binders and Durite™. Polycarbimide binders were in powder form and were mixed into the soybean meal at a level of 1% (as is w/w). The mixture was conditioned to 80° C. by direct addition of steam and extruded through a 1¼×5/32 inch die (L×D). Pellets were rapidly returned to ambient temperature by evaporative cooling under a stream of forced air. Liquid Durite™ was applied by addition to the steam supply line such that it was atomized onto the feed in the conditioning chamber. Application level of Durite™ was 0.9% (dry matter w/w).

Pelleted samples were coarsely ground and tested for crude protein and RUP as in previous examples. Pelleting with commercial polycarbimide based pellet binders had negligible impact on RUP. RUP values with these binders averaged 32.9% versus 40.3% when a similar amount of Durite™ was applied.

TABLE I

Comparison of Durite ™ to commercial polycarbimide binders in pelleted soybean meal

| I.D. | Treatment | CP, % of DM | RUP, % of DM |
|---|---|---|---|
| 399-104-1 | Untreated | 53.3 | 27.0 |
| 399-104-2 | SupraBind ™, 1% | 52.7 | 32.9 |
| 399-104-3 | Xtra-Bond ™, 1% | 52.3 | 32.9 |
| 399-104-4 | Basfin ™, 1% | 51.9 | 32.9 |
| 399-104-5 | MaxiBond ™, 1% | 53.2 | 29.5 |
| 399-104-7 | Durite ™, 0.9% | 52.8 | 40.3 |

Example 10

Solvent extracted soybean meal was sieved to a particle range for testing with diameters between 0.8 and 1.7 millimeters. A portion was set aside without any treatment to act as a negative control (Control). A second portion was combined with 0.75% by weight on a solids basis of a powdered UF polymer from DYNEA resins labeled Exp 710. Prior to mixing, sufficient water was added to the soybean meal/UF polymer mixture to take the total moisture content to 20% by weight. The mixture was then placed in a kitchen steamer for 60 minutes. The resulting material was oven dried for 15 minutes at 105° C. and spread on paper to cool and dry. The control portion was then treated in a similar manner except no UF polymer was added.

Samples were tested for crude protein (CP) which was reported as a percentage of dry matter (DM). Samples were tested for rumen undegradable protein (RUP) by incubation in a porous Dacron bag suspended in the rumen of a dairy cow for 16 hours, after which the residual crude protein was measured and reported as a percentage of the original protein placed in the bags.

TABLE A

Effect of 1% Exp 710 Powder

| Treatment | CP, % of DM | RUP, % of CP |
|---|---|---|
| Control | 48.9 | 52.2 |
| 0.75% Exp 710 | 50.8 | 84.5 |

Treatment with 0.75% Exp 710 resulted in an RUP level that was superior to the control. In addition, treatment with Exp 710, a nitrogenous polymer, increased the level of crude protein in the sample. This is an important advantage because the end use of the product is as a protein source for ruminants.

As can be understood from the above description, the novel feed, method of making the feed and method of feeding animals has the advantage of providing a superior economical feed and method of feeding animals.

Although a preferred embodiment has been described with some particularity, many modifications and variations may be made in the preferred embodiment without deviating from the invention. Accordingly, it is to be understood that, within the scope of the appended claims, the invention may be practiced other than as specifically described.

We claim:

1. A feed for ruminants comprising a protein-containing feed having at least one reaction product of a feed protein in said protein-containing feed and a urea-formaldehyde polymer, wherein the percentage of urea-formaldehyde polymer is about 0.1 percent to about 3 percent by weight of said protein-containing feed such that degradability of the feed protein by rumen microorganisms is reduced and there is no significant reduction of protein digestibility in the post rumen tract,
   said reaction product resulting from heating a mixture of the feed protein and urea-formaldehyde polymer at a temperature of from about 80 degrees centigrade to about 110 degrees centigrade, for a time of about 20 minutes to about 72 hours, and at a percent moisture from about 15 percent to about 25 percent.

2. A feed according to claim 1 wherein said feed protein is a component of a feedstuff selected from the group consisting of bean meal, cottonseed meal, feather meal, blood meal, silages, meat and bone meal, sunflower seed meal, canola meal, peanut meal, safflower meal, linseed meal, sesame meal, early bloom legumes, fish products, by-product protein feedstuffs, milk products, poultry products, hays, corn, wheat, alfalfa, barley, milo, sorghum, tapioca, soybean, sunflower seed, canola seed, rape seed, cottonseed, flaxseed, linseed, safflower seed, sesame seed, and mixtures thereof.

3. A feed according to claim 2 wherein the bean meal is soybean meal.

4. A feed according to claim 2 wherein the by-product protein feedstuffs include distillers grain.

5. A feed according to claim 1 wherein the percentage of urea-formaldehyde polymer in said protein-containing feed is about 0.4 percent to 1 percent by weight.

6. A feed according to claim 1 wherein the urea-formaldehyde polymer has a formaldehyde to urea ratio of about 2.0 to about 0.8 by weight.

7. A method of making a ruminant feed comprising the steps of:
   providing a mixture of a protein-containing feed having a feed protein and urea-formaldehyde polymer, the percentage of urea-formaldehyde polymer being about 0.1 percent to about 3 percent by weight of said protein-containing feed; and
   heating the mixture at a temperature, and percent moisture for a time sufficient to reduce the degradability of the feed protein by rumen microorganisms and provide no significant reduction in protein digestibility in the post rumen tract,
   wherein the temperature of heating ranges from about 80 degrees centigrade to about 110 degrees centigrade, and the time of heating is about 20 minutes to about 72 hours, and the percent moisture ranges from about 15 percent to about 25 percent.

8. A method according to claim 7 wherein said time is from about 30 minutes to about 2 hours.

9. A method according to claim 7 wherein said feed protein is a component of a feedstuff selected from the group consisting of bean meal, cottonseed meal, feather meal, blood meal, silages, meat and bone meal, sunflower seed meal, canola meal, peanut meal, safflower meal, linseed meal, sesame meal, early bloom legumes, fish products, by-product protein feedstuffs, milk products, poultry products, hays, corn, wheat, alfalfa, barley, milo, sorghum, tapioca, soybean, sunflower seed, canola seed, rape seed, cottonseed, flaxseed, linseed, safflower seed, sesame seed, and mixtures thereof.

10. A method according to claim 9 wherein the by-product protein feedstuffs include brewers grain.

11. A method according to claim 9 wherein the bean meal is soybean meal.

12. A method according to claim 7 wherein the urea-formaldehyde polymer has a formaldehyde to urea ratio of about 2.0 to about 0.8 by weight.

13. A method of feeding ruminants comprising the steps of:
selecting a protein-containing feed; and
feeding to a ruminant a reaction product of a feed protein in said protein-containing feed and urea-formaldehyde polymer wherein the percentage of urea-formaldehyde polymer is about 0.1 percent to about 3 percent by weight of said protein-containing feed, such that degradability of the feed protein by rumen microorganisms is reduced and there is no significant reduction of protein digestibility in the post rumen tract,
said reaction product resulting from heating a mixture of the feed protein and urea-formaldehyde polymer at a temperature of from about 80 degrees centigrade to about 110 degrees centigrade, for a time of about 20 minutes to about 72 hours, and at a percent moisture from about 15 percent to about 25 percent.

14. A method of feeding ruminants according to claim 13 wherein said feed protein is a component of a feedstuff selected from the group consisting of bean meal, cottonseed meal, feather meal, blood meal, silages, meat and bone meal, sunflower seed meal, canola meal, peanut meal, safflower meal, linseed meal, sesame meal, early bloom legumes, fish products, by-product protein feedstuffs, milk products, poultry products, hays, corn, wheat, alfalfa, barley, milo, sorghum, tapioca, soybean, sunflower seed, canola seed, rape seed, cottonseed, flaxseed, linseed, safflower seed, sesame seed, and mixtures thereof.

15. A method according to claim 14 wherein the by-product protein feedstuffs include distillers grain.

16. A method according to claim 14 wherein the by-product protein feedstuffs is brewers grain.

17. A method according to claim 14 wherein the bean meal is soybean meal.

18. A method according to claim 13 wherein the urea-formaldehyde polymer has a formaldehyde to urea ratio of about 2.0 to about 0.8 by weight.

19. A feed for animals comprising a lipid-containing feed having oil therein coated with a reaction product of a urea-formaldehyde polymer and a proteinaceous material in said lipid-containing feed,
said reaction product resulting from heating a mixture of the lipid-containing feed and urea-formaldehyde polymer at a temperature of from about 80 degrees centigrade to about 110 degrees centigrade, for a time of about 20 minutes to about 72 hours, and at a percent moisture from about 15 percent to about 25 percent.

20. A feed in accordance with claim 19 in which the oil is selected from the group consisting of soybean oil, sunflower seed oil, canola seed oil, rape seed oil, cottonseed oil, corn oil, flaxseed oil, linseed oil, safflower seed oil, sesame seed oil, and mixtures thereof.

21. A feed in accordance with claim 19 in which the reaction product falls within a range of 1% to 35% by weight of the proteinaceous material.

22. A feed according to claim 1 wherein the temperature at which the mixture is heated ranges from about 95 degrees centigrade to about 105 degrees centigrade.

23. A feed according to claim 1 wherein the percent moisture of the mixture ranges from about 18 percent to about 22 percent.

24. The method according to claim 7 wherein the temperature at which the mixture is heated ranges from about 95 degrees centigrade to about 105 degrees centigrade.

25. The method according to claim 7 wherein the percent moisture of the mixture ranges from about 18 percent to about 22 percent.

26. The method according to claim 13 wherein the temperature at which the mixture is heated ranges from about 95 degrees centigrade to about 105 degrees centigrade.

27. The method according to claim 13 wherein the percent moisture of the mixture ranges from about 18 percent to about 22 percent.

28. A feed according to claim 19 wherein the temperature at which the mixture is heated ranges from about 95 degrees centigrade to about 105 degrees centigrade.

29. A feed according to claim 19 wherein the percent moisture of the mixture ranges from about 18 percent to about 22 percent.

* * * * *